United States Patent
Kuchel et al.

(10) Patent No.: US 7,319,198 B2
(45) Date of Patent: Jan. 15, 2008

(54) HOUSINGLESS LOAD CELL

(75) Inventors: Andreas Kuchel, Hamburg (DE); Jörg Herrnring, Hamburg (DE)

(73) Assignee: Sartorius Hamburg GmbH, Hamburg (DE)

( * ) Notice: Subject to any disclaimer, the term of this patent is extended or adjusted under 35 U.S.C. 154(b) by 10 days.

(21) Appl. No.: 10/569,931

(22) PCT Filed: Aug. 31, 2004

(86) PCT No.: PCT/EP2004/009680

§ 371 (c)(1),
(2), (4) Date: Feb. 27, 2006

(87) PCT Pub. No.: WO2005/024357

PCT Pub. Date: Mar. 17, 2005

(65) Prior Publication Data

US 2007/0007049 A1 Jan. 11, 2007

(30) Foreign Application Priority Data

Sep. 5, 2003 (DE) .......................... 103 41 482

(51) Int. Cl.
*G01G 3/14* (2006.01)
(52) U.S. Cl. .................... 177/211; 73/862.621
(58) Field of Classification Search ............... 177/211, 177/229; 73/862.621–862.639
See application file for complete search history.

(56) References Cited

U.S. PATENT DOCUMENTS

| 2,901,235 | A |   | 8/1959  | Bradley |
| 4,804,053 | A | * | 2/1989  | Nordstrom ............ 177/211 |
| 4,838,372 | A |   | 6/1989  | Krause |
| 6,888,074 | B2 | * | 5/2005  | Haggstrom ............ 177/211 |
| 6,973,837 | B2 | * | 12/2005 | Barnett .................. 73/765 |
| 2002/0069708 | A1 |   | 6/2002  | McKenna |

FOREIGN PATENT DOCUMENTS

| EP | 0 800 069 | 10/1997 |
| WO | WO 01/18504 | 3/2001 |

* cited by examiner

*Primary Examiner*—Randy W Gibson
(74) *Attorney, Agent, or Firm*—Rankin, Hill, Porter & Clark LLP

(57) ABSTRACT

The invention relates to a housingless load cell whose resistance and measuring accuracy can be improved with respect to environmental influences such that at least the predominant part of the surface (12) and/or the surface (14) has a transversal path, such that water hitting the body of the load cell (1) can flow off when the load cell is in a built-in state. The angle $\alpha_1$ between the transversally extending part of the surface (12) and the perpendicular peripheral surface of the body (3) and/or the angle $\beta_2$ between the transversally extending part of the surface (14) and the peripheral surface of the leg (4) is respectively greater than 90° and is, more particularly between 93°- 120°. A housingless load cell comprising a compensation electronics system is provided in one of the transversal holes (7). Finally, a load cell is further developed such that the peripheral surface of the leg (4) comprises at least one essentially perpendicular groove (24) forming a rotational lock piston with a protruding element on the lower plate.

20 Claims, 3 Drawing Sheets

HOUSINGLESS LOAD CELL

Figure 1:
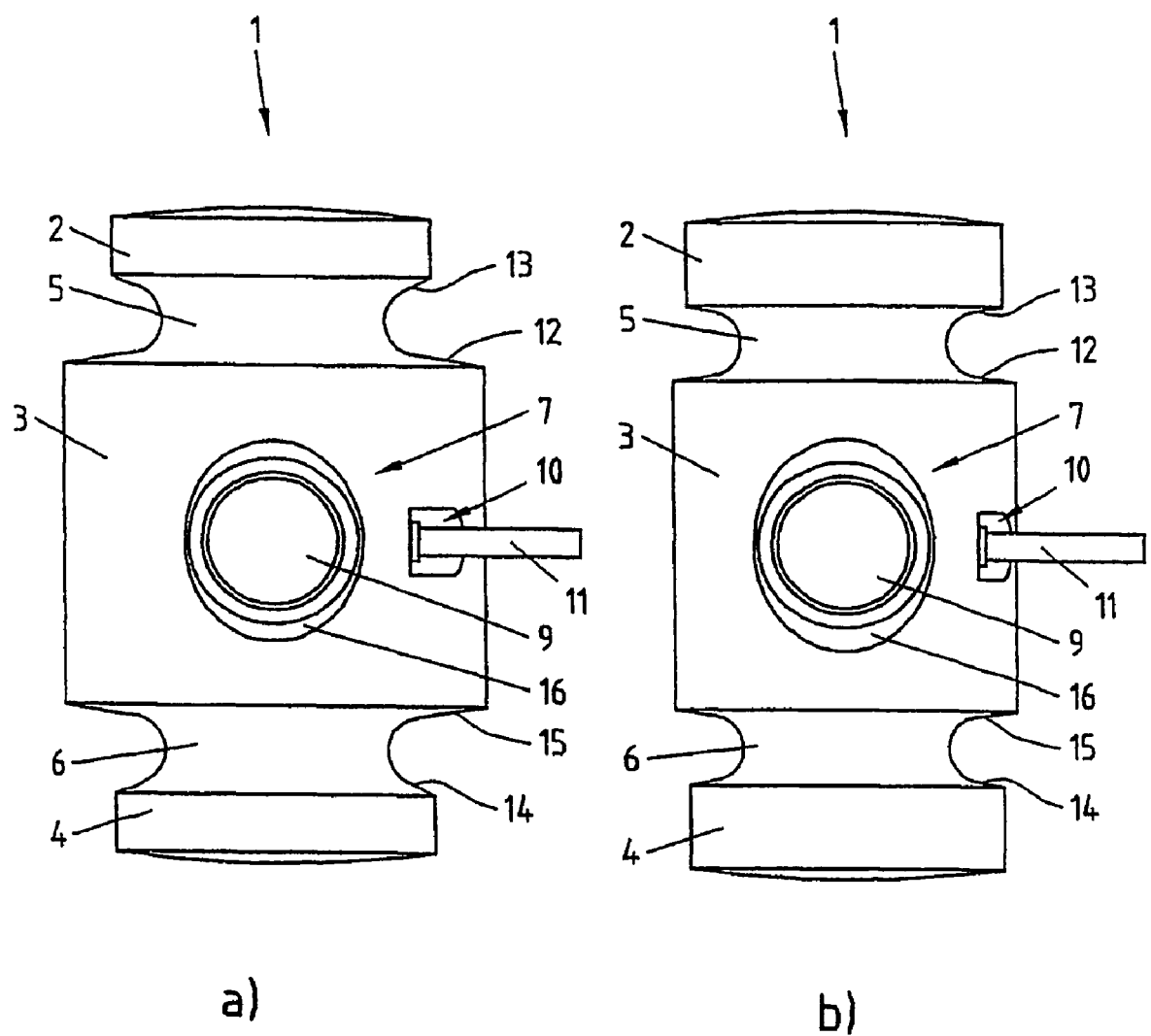

The invention relates to a non-encased weighing cell with a weighing-cell body, comprising a head, a trunk and a foot, wherein the head is set apart from the trunk by at least one top recess, which extends in a rotationally symmetrical manner around the longitudinal axis of the weighing-cell body, wherein the recess comprises a surface that tapers off towards the trunk and a surface that tapers off towards the head; the trunk is essentially cylindrical in shape, and the trunk is set apart from the foot by at least one bottom recess that extends in a rotationally symmetrical manner around the longitudinal axis of the weighing-cell body, wherein the recess comprises a surface that tapers off towards the foot and a surface that tapers off towards the trunk.

As a rule, weighing cells, for example pendulum weighing cells for use in weighing machines for road vehicles, comprise a measuring element to which a wire strain gauge has been glued, which measuring element hereinafter is referred to as a weighing-cell body.

The weighing-cell body is made of a high-strength metal material, as a rule of steel; it comprises a head, a foot, and a trunk arranged in between. In a suitable position on the surface of the weighing-cell body, usually on the essentially cylindrical trunk, wire strain gauges are arranged. These wire strain gauges, as a rule Konstantan or Karma wire strain gauges, are usually electrically wired as a Wheatstone full bridge.

To protect the wire strain gauges from water, humidity or dirt, a separate housing is arranged around the weighing-cell body. Furthermore, a balancing chamber has been affixed to this housing, which balancing chamber comprises electronics for electrically balancing the weighing cell, for example for determining the zero point, the characteristic value, the temperature behaviour etc., and if necessary a signal processing device. This balancing chamber is also used for protecting the electronic components from humidity and dirt.

Furthermore, weighing cells are known in which in the trunk, on an axis perpendicular to the longitudinal axis of the weighing-cell body, a transverse through-hole is provided, in whose centre a membrane has subsequently been installed, onto which membrane the wire strain gauges are glued. Instead of providing one through-hole and a separate membrane, it is also known to provide two transverse holes that are positioned on the same axis, wherein the depth of said transverse holes is less than the radius of the trunk, and wherein said transverse holes form a web between themselves, which web assumes the function of the membrane, and onto which web the wire strain gauges are glued.

In order to achieve a targeted load introduction from the end surfaces of the head and of the foot into the trunk, in particular in the direction of a web or of a membrane, recesses that are aligned so as to be rotationally around symmetrical the longitudinal axis of the weighing-cell body are provided, through which recesses the head is set apart from the trunk, and the trunk is set apart from the foot.

Actually, in those cases where the wire strain gauges are arranged on a web in the interior of the trunk said wire strain gauges are better protected when compared to those cases where they are arranged on the perpendicular circumferential surface of the trunk so that such a weighing cell can be used even without a separate housing that encloses the entire weighing cell, which results in a considerable cost reduction. However, it is still possible for humidity and dirt to collect in various positions on the weighing-cell body, including in the transverse holes, and in this way damage the weighing-cell body, for example through corrosion. In particular, in the region of the rotationally symmetrical recesses that set the trunk apart from the head or the foot, moisture can collect.

Furthermore, even if no separate housing that encloses the entire weighing cell is provided, a balancing chamber to accommodate the balancing electronics is still required.

The known weighing cell is associated with a further disadvantage in that it can be subject to torsion during operation, which results in measuring errors.

Starting with the problems shown above, it is the object of the present invention to create a non-encased weighing cell which is particularly resistant to environmental influences, and which features very good measuring accuracy.

According to the invention the above-derived and shown object is first of all met in that in a non-encased weighing cell with the characteristics of the precharacterising part of claim 1 at least the predominant part of the surface of the top recess, which surface tapers off towards the trunk, and/or the predominant part of the surface of the bottom recess, which surface tapers off towards the foot, is inclined such that in the installed state, as intended, of the weighing cell any water hitting the weighing-cell body can flow away, wherein the angle $\alpha_1$ between the inclined part of the surface of the top recess, which surface tapers off towards the trunk, and the perpendicular circumferential surface of the trunk and/or the angle $\beta_2$ between the inclined part of the surface of the bottom recess, which surface tapers off towards the foot, and the circumferential surface of the foot is larger than 90°, and in particular is between 93° and 120°. A value of 117.5° has been shown to be particularly suitable.

In this way a situation can be achieved in which in the region of the recesses almost no plane surfaces perpendicular to the longitudinal axis of the weighing-cell body are present any longer, on which surfaces moisture and dirt can accumulate. It is quite possible for a narrow annular region in the end region of the surface tapering off towards the trunk or towards the head to be present, which annular region is not inclined but extends so as to be perpendicular in relation to the longitudinal axis of the weighing-cell body, which annular region, however, due to its small size when compared to the much larger inclined part of the surface of the respective recess does not have any effect on the outflow of the water. Thus, in longitudinal section along the longitudinal axis of the weighing-cell body, the surface line of the top recess and/or of the bottom recess in the respective regions tapering off downwards always have an incline which ideally extends right to the edge of the trunk or of the foot. Water reaching this region, or moisture collecting in this region drains in this way, wherein dirt particles are also flushed away. Thus the danger of corrosion in the region of the recesses is clearly reduced.

In addition it can be provided for at least the predominant part of the surface of the top recess, which surface tapers off towards the head, and/or the predominant part of the surface of the bottom recess, which surface tapers off towards the trunk, is inclined, such that in the installed state, as intended, of the weighing cell any water hitting the weighing-cell body can flow away, wherein the angle $\alpha_2$ between the surface of the bottom recess, which surface tapers off towards the trunk, and the perpendicular circumferential surface of the trunk and/or the angle $\beta_1$ between the surface of the top recess, which surface tapers off towards the head, and the circumferential surface of the head is larger than 90°, and in particular is between 93° and 120°, wherein in the upper region of the recesses, too, an inclined surface is formed from which surface water can drain off more easily than from a horizontal surface. A value of 117.5° has been shown to be particularly suitable.

If the diameter of the head and/or the diameter of the foot is smaller than the diameter of the trunk, the surface of the top recess, which surface tapers off towards the trunk, can be inclined also in that region that is not covered by the head, and/or the surface of the bottom recess, which surface tapers off towards the trunk, can be inclined also in that region that is not covered by the foot. The designation "covered" refers to the region of the inclined surfaces, which region in a top or bottom view of the weighing-cell body is covered by the head or the foot and is thus not visible.

Advantageously, the longitudinal section of the top recess and/or of the bottom recess has at least in part a shape of the surface line that is curved, in particular shaped in a circular arc, an ellipsis or a parabola. However, other shapes of the surface line are imaginable, provided the gradient of the surfaces in the region of the recess is sufficient for the moisture to drain off optimally.

In a further advantageous embodiment the transition region between the surface of the top recess, which surface tapers off towards the trunk, and the perpendicular circumferential surface of the trunk and/or the transition region between the surface of the bottom recess, which surface tapers off towards the foot, and the circumferential surface of the foot, is inclined or rounded. Accordingly, it is imaginable that in each case the transition region between the surface of the top recess that tapers off towards the head and the circumferential surface of the head is inclined or rounded. In this way edges are prevented and instead a shape is created from which water can drain off well.

Also in the transition region between the interior surface of the transverse holes and the perpendicular circumferential surface of the trunk, edges can be avoided by using inclined or rounded shapes.

According to the invention, the object derived and shown above is met in that in a non-encased weighing cell with the characteristics of the precharacterising part of claim 11 wire strain gauges are arranged on the web, which wire strain gauges are electrically connected to balancing electronics that are arranged in one of the transverse holes. In this way there is no longer a need to provide a separate balancing chamber to accommodate the balancing electronics, which balancing electronics can comprise a printed circuit board which on one side can comprise a device for temperature compensation, in particular a meandering layer of nickel. In this way the balancing electronics are arranged directly in the region of the wire strain gauges.

Advantageously the wire strain gauges are enclosed by a casting compound, for example a casting compound made of plastic, in particular flexible plastic, so that said wire strain gauges are now fully protected from humidity or dirt in the transverse holes. At the same time the casting compound can serve as an attachment for the printed circuit board in that said printed circuit board is at least partially embedded in the casting compound.

A particularly good measuring result is achieved if on each side of the web at least one wire strain gauge is arranged. In this case, to establish an electrical connection between the wire strain gauges and the balancing electronics a borehole can be provided in the web, through which web the connecting lines lead. Furthermore, the weighing-cell body can comprise a cable bushing through which the signal lines and current supply lines lead from one of the transverse holes to the outside into a weighing-cell cable. Advantageously, this cable bushing is sealed off against humidity and dirt.

Particularly good protection from humidity and dirt is achieved if the transverse holes are covered by covers. Sealing off the covers can take place by means of welding, in particular microplasm welding. In this way optimal sealing action of the covers is achieved. It is also possible, as an alternative or in addition, to glue, screw and/or tighten the covers.

Finally, according to the invention, the previously derived and shown object is met in that in a weighing cell with the characteristics of the precharacterising part of claim 23 the circumferential surface of the foot comprises at least one groove that is essentially perpendicular, which groove in each instance can interact, in the installed state of the weighing cell, with an element that is provided on the base plate and that projects therefrom. Such a projecting element can for example be a pin, which in particular extends perpendicularly to the longitudinal axis of the weighing-cell body. Also imaginable are several grooves that are circumferentially arranged at even spacing, as well as several corresponding elements in the base plate. In this way a device to prevent torsion of the weighing cell can be created, which device ensures permanent positioning of said weighing cell, thus clearly reducing the risk of measuring errors occurring.

Figure 2:
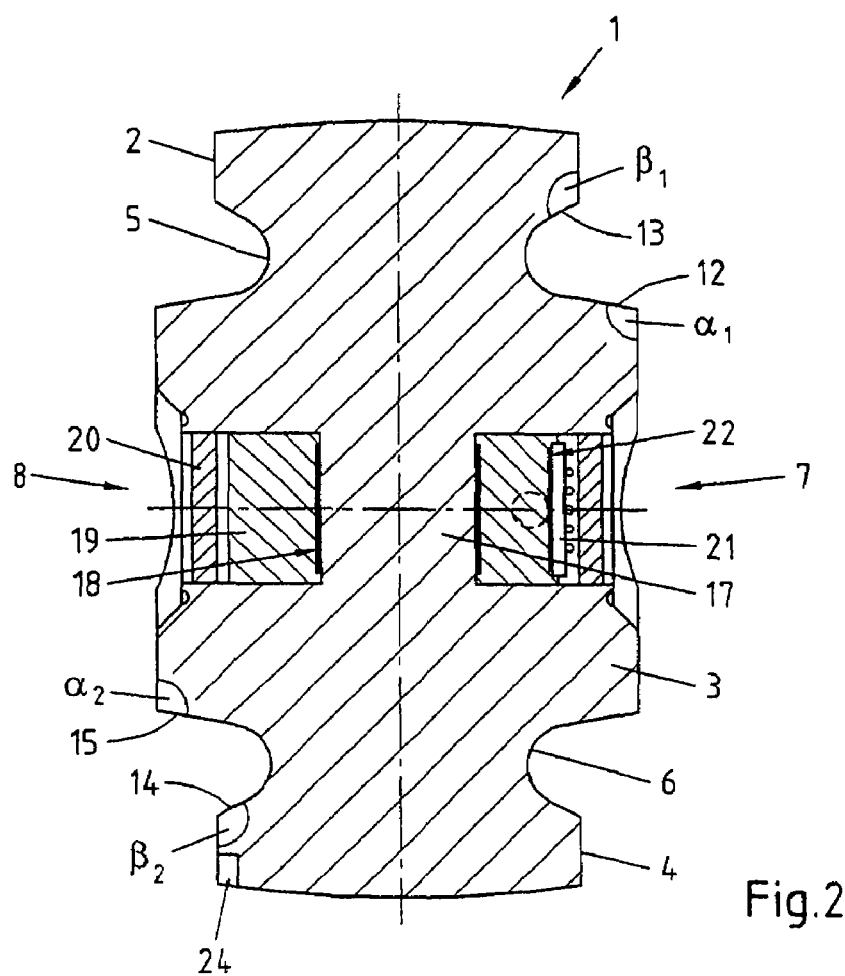
Figure 3:
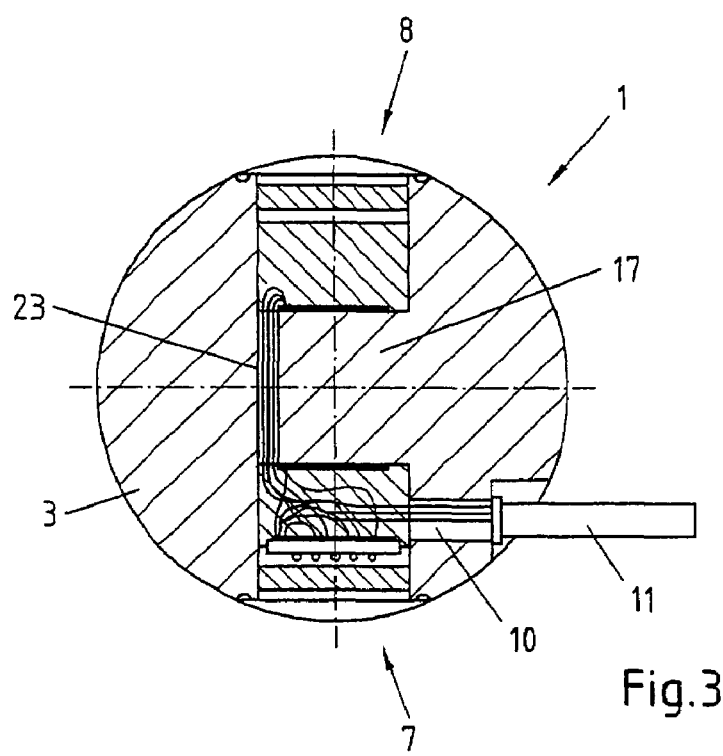

Below, the invention is explained with reference to drawings that show exemplary embodiments. It is shown schematically in:

FIGS. 1a) and b) the weighing cell according to the invention for two different load stages;

FIG. 2 a longitudinal section of the weighing cell shown in FIG. 1a);

FIG. 3 a cross section of the weighing cell shown in FIG. 1a); and

Figure 4:
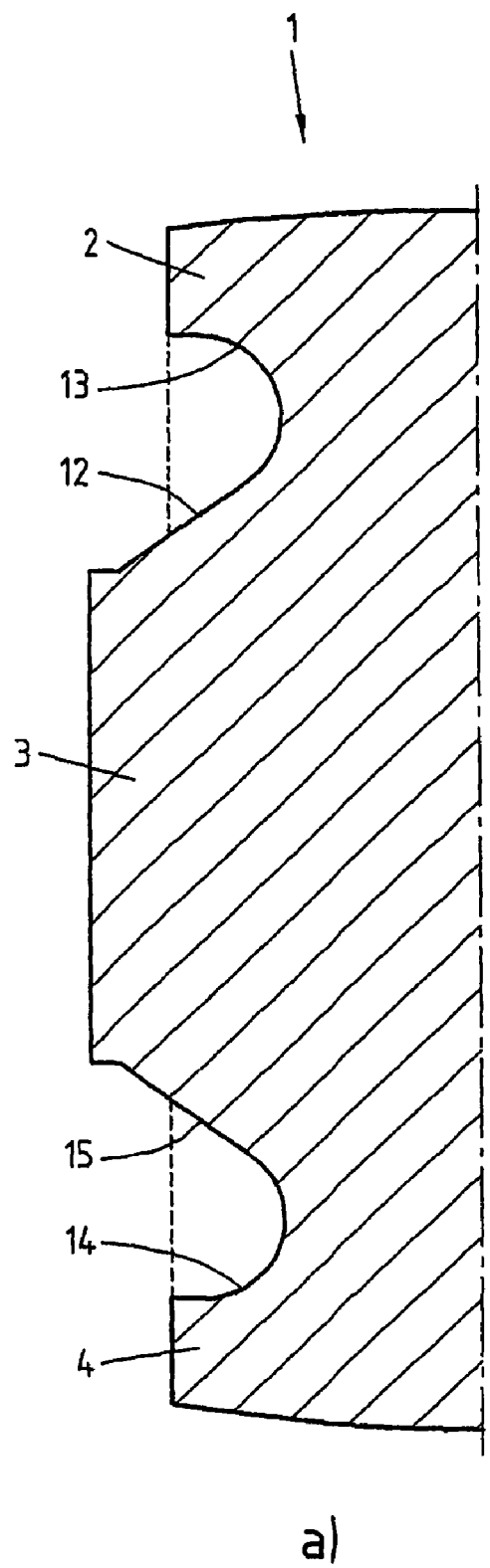
Figure 4:
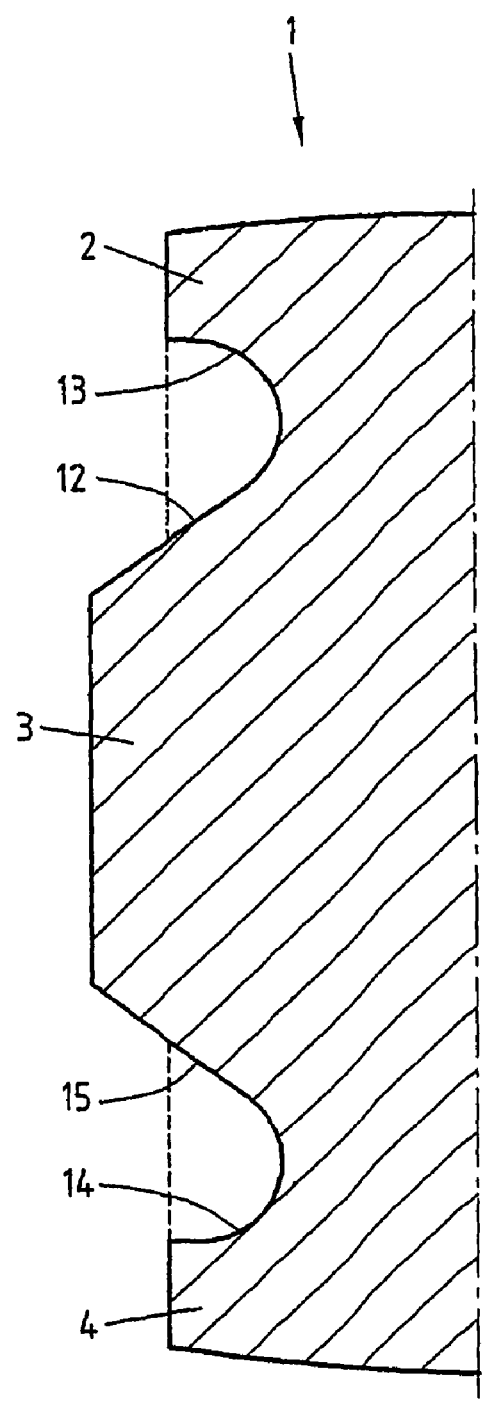

FIGS. 4a) and b) a longitudinal section of two exemplary embodiments of the weighing cell according to the invention.

FIGS. 1a) and b) show a non-encased weighing cell for two different load stages, namely in FIG. 1a for a load stage of 50 t and in FIG. 1b for a load stage of 25 t. In each instance the weighing cell shown comprises a weighing-cell body 1, which in turn comprises a head 2, a trunk 3 and a foot 4. The head 2 is set apart from the trunk 3 by a top recess 5, which extends in a rotationally symmetrical manner around the longitudinal axis of the weighing-cell body 1. Towards the bottom the trunk 3 is set apart from the foot 4 by a corresponding recess 6. In its perpendicular circumferential surface the essentially cylindrical trunk 3 comprises two transverse holes 7 and 8, of which only one transverse hole 7 is shown in the view selected in FIGS. 1a) and b). In each case the transverse holes are tightly sealed off by a welded-on cover 9.

Furthermore, a cable bushing 10 is provided in the weighing-cell body 1, through which cable bushing 10 the signal lines and current supply lines are led from the front transverse hole 7 towards the outside in a weighing-cell cable 11.

Since the weighing cell depicted does not comprise a separate casing and is thus directly exposed to environmental influences, in particular to water, humidity, dirt etc., there are no flat surfaces extending perpendicularly to the longitudinal axis. It is clearly illustrated that the surface 12 that tapers off towards the trunk 3, and the surface 13 of the top recess 5, which surface 13 tapers off towards the head 2, are inclined so that water or moisture drains off directly and cannot collect. The surface 14 that tapers off towards the foot 4, and the surface 15 that tapers off towards the trunk 3, of the bottom recess 6, are designed correspondingly. Similarly, the transition region 16 between the internal surface of the transverse holes 7 and 8 and of the perpendicular circumferential surface of the trunk 3 is somewhat inclined so that here, too, water can drain off directly.

The principle on which the non-encased weighing cell according to the invention is based is further illustrated in FIG. 2. FIG. 2 shows a longitudinal section of the weighing cell from FIG. 1a). Here, too, the illustration shows that there is no horizontal surface that extends perpendicularly to the longitudinal axis, on which surface the humidity could collect. Thus the two recesses 5 and 6 are designed such that the angle $\alpha_1$ between the surface 12 of the top recess 5, which surface tapers off towards the trunk 3, and the perpendicular circumferential surface of the trunk 3 exceeds 90°. The same applies to the angle $\beta_2$ between the surface 14 of the bottom recess 6, which surface tapers off towards the foot 4, and the circumferential surface of the foot 4. Finally, both the angle $\alpha_2$ between the surface 15 of the bottom recess 6, which tapers off towards the trunk 3, and the perpendicular circumferential surface of the trunk 3, as well as the angle $\beta_1$ between the surface 13 of the top recess 5, which surface tapers off towards the head 2, and the circumferential surface of the head 2 are larger than 90°. In the region of the recesses 5 and 6 the surface line is approximately parabolic.

FIG. 2 further shows the two transverse holes 7 and 8, which are sufficiently deep for a web 17 to be formed between them, at both sides of which web 17 a wire strain gauge 18 has been glued on. In each instance the wire strain gauge 18 is enclosed by a casting compound made of flexible plastic. The relatively soft casting compound 19 ensures that the wire strain gauges 18 are permanently protected against mechanical and climatic influences, in particular also during the balancing procedure.

In each instance a separate cover 20, which has been welded on, seals the two transverse holes 7 and 8 off towards the outside.

Furthermore, the transverse hole 7 comprises the balancing electronics comprising a printed circuit board 21 and a meandering layer 22, made of nickel, for temperature compensation. The balancing electronics are affixed in that one face of the printed circuit board 21 is embedded in the casting compound 19. In this way there is no need whatsoever for a separate balancing chamber since the latter is formed by the transverse hole 7.

FIG. 2 further shows a perpendicular groove 24 with which a pin that extends perpendicularly to the longitudinal axis of the weighing cell can interact, wherein said pin is firmly connected to a base plate which in the installed state carries the weighing cell.

This device to prevent torsion ensures permanent positioning to reduce the sensitivity error when the weighing cell is at an inclined position. Of course it is also possible to provide several grooves, for example three grooves, which advantageously are distributed on the circumference of the weighing-cell body so as to be regularly spaced apart.

FIG. 3 shows a cross section of the weighing-cell from FIG. 1a). The illustration clearly shows that a borehole 23 extends through the web 17 that is in place between the transverse holes 7 and 8, through which borehole 23 the lines for electrical connection of the wire strain gauges 18 to the balancing electronics lead. Furthermore, the cable bushing 10 is shown, through which the signal lines and current supply lines lead from the transverse hole 7 towards the outside into the weighing cell cable 11.

FIGS. 4a) and b) show a longitudinal section of two embodiments of the weighing cell according to the invention. FIG. 4a) shows a weighing cell in which the predominant part of the surface 12 of the top recess 5, which surface tapers off towards the trunk 3, as well as the predominant part of the surface 15 of the bottom recess 6, which surface tapers off towards the trunk 3, is inclined, and that only in the end region of the surfaces 12 and 15 is there a narrow annular region which extends perpendicularly to the longitudinal axis of the weighing-cell body 1.

FIG. 4b shows an embodiment according to the solution according to the invention, which embodiment is to be preferred over that shown in FIG. 4a, in which preferred embodiment the surfaces 12 and 15 are inclined up to the upper or lower edge of the trunk 3. FIGS. 4a) and b) further show that the surface 12 and the surface 15 are inclined also in that region that is not covered by the head 2 or by the foot 4. In each instance the covered region is to the right of the dashed line, while the non-covered region is to the left of the dashed line.

The invention claimed is:

1. A non-encased weighing cell with a weighing-cell body (1), comprising a head (2), a trunk (3) and a foot (4), wherein the head (2) is set apart from the trunk (3) by at least one top recess (5), which extends in a rotationally symmetrical manner around the longitudinal axis of the weighing-cell body (1), wherein the top recess (5) comprises a first surface (12) that tapers off towards the trunk (3) and a second surface (13) that tapers off towards the head (2); the trunk (3) is essentially cylindrical in shape, and the trunk (3) is set apart from the foot (4) by at least one bottom recess (6) that extends in a rotationally symmetrical manner around the longitudinal axis of the weighing-cell body (1), wherein the bottom recess (6) comprises a third surface (14) that tapers off towards the foot (4) and a fourth surface (15) that tapers off towards the trunk (3), wherein at least the predominant part of at least one of the first surface (12) and the third surface (14) is inclined such that in the installed state, as intended, of the weighing cell any water hitting the weighing-cell body (1) can flow away, wherein at least one of an angle $\alpha_1$ between the inclined part of the first surface (12) and the perpendicular circumferential surface of the trunk (3) and an angle $\beta_2$ between the inclined part of the third surface (14) and the circumferential surface of the foot (4) is larger than 90°.

2. The non-encased weighing cell according to claim 1, wherein at least a predominant part of at least one of the second surface (13) the fourth surface (15) is inclined such that in the installed state, as intended, of the weighing cell any water hitting the weighing-cell body (1) can flow away, wherein at least one of the angle $\alpha_2$ between the fourth surface (15) and the perpendicular circumferential surface of the trunk (3) and the angle $\beta_1$ between the second surface (13) and the circumferential surface of the head (2) is between 93° and 120°.

3. The non-encased weighing cell according to claim 1, wherein at least one of a diameter of the head (2) and a diameter of the foot (4) is smaller than a diameter of the trunk (3), wherein the first surface (12) is inclined also in that region that is not covered by the head (2), and/or the fourth surface (15) is inclined also in that region that is not covered by the foot (4).

4. The non-encased weighing cell according to claim 1, wherein the longitudinal section of at least one of the top recess (5) and the bottom recess (6) has, at least in part, a shape of the surface line that is curved.

5. The non-encased weighing cell according to claim 4, wherein the shape is selected from the group consisting of: circular arc, ellipsis and parabola.

6. The non-encased weighing cell according to claim 1, wherein at least one of a transition region between the first surface (12) of the top recess (5) and a perpendicular circumferential surface of the trunk (3) and a transition region between the third surface (14) of the bottom recess (6) and the circumferential surface of the foot (4), is inclined or rounded.

7. The non-encased weighing cell according to claim 1, wherein an upper end surface of the head (2) is a spherical surface.

8. The non-encased weighing cell according to claim 1, wherein in the trunk (3) on an axis perpendicular to the longitudinal axis of the weighing-cell body (1) two transverse holes (7, 8) with a depth less than a radius of the trunk (3) are provided, wherein said transverse holes (7, 8) form a web (17) between themselves, and wherein wire strain gauges (18) are arranged on the web (17), which wire strain gauges (18) are electrically connected to balancing electronics that are arranged in one of the transverse holes (7).

9. The non-encased weighing cell according to claim 8, wherein the balancing electronics comprise a printed circuit board (21) that, on one side, comprises a device for temperature compensation.

10. The non-encased weighing cell according to claim 9, wherein the device for temperature compensation is a meandering layer (22) of nickel.

11. The non-encased weighing cell according to claim 8, wherein the wire strain gauges (18) are enclosed by a casting compound (19).

12. The non-encased weighing cell according to claim 11, wherein the casting compound (19) is a flexible plastic material.

13. The non-encased weighing cell according to claim 11, wherein the printed circuit board is at least partly embedded in the casting compound (19).

14. The non-encased weighing cell according to claim 8, wherein at least one wire strain gauge (18) is arranged on each side of the web (17).

15. The non-encased weighing cell according to claim 14, wherein, for electrical connection between the wire strain gauges (18) and the balancing electronics, a borehole (23) is provided in the web (17).

16. The non-encased weighing cell according to claim 8, wherein the weighing-cell body (1) comprises a cable bushing (10) through which the signal lines and current supply lines lead from one of the transverse holes (7) to the outside into a weighing-cell cable (11).

17. The non-encased weighing cell according to claim 16, wherein the cable bushing (10) is sealed off from humidity and dirt.

18. The non-encased weighing cell according to claim 8, wherein the transverse holes (7, 8) are closed by covers (9).

19. The non-encased weighing cell according to claim 18, wherein the covers (9) are at least one of welded, glued, screwed, and riveted into place.

20. A weighing cell, in particular a non-encased weighing cell according to claim 1, with a weighing-cell body (1), wherein the circumferential surface of the foot (4) comprises at least one groove (24) that is essentially perpendicular to the longitudinal axis of the weighing-cell body (1), which groove in each instance can interact, in the installed state of the weighing cell, with an element that is provided on a base plate and that projects therefrom, a pin that extends in particular so as to be perpendicular in relation to the longitudinal axis of the weighing-cell body (1).

* * * * *